Figure 1:
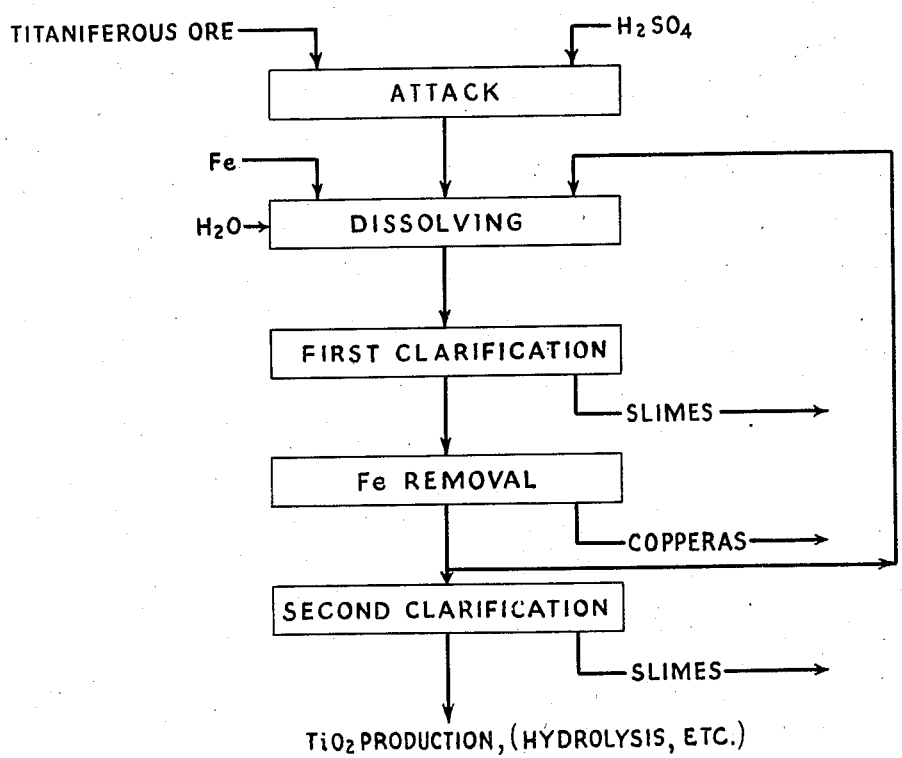

Dec. 31, 1946.　　　R. M. McADAM　　　2,413,641
PRODUCTION OF STABLE TITANIUM SOLUTIONS
Filed May 26, 1944

Robert M. McAdam, INVENTOR.
BY
ATTORNEY

Patented Dec. 31, 1946

2,413,641

UNITED STATES PATENT OFFICE 2,413,641

PRODUCTION OF STABLE TITANIUM SOLUTIONS

Robert Martin McAdam, Wilmington, Del., assignor to E. I. du Pont de Nemours & Company, Wilmington, Del., a corporation of Delaware Application May 26, 1944, Serial No. 537,409

4 Claims. (Cl. 23—117)

This invention relates to the production of soluble titanium compounds from titaniferous ores, and more particularly to the preparation of titanium salt solutions having a high titanium content from relatively low-grade titaniferous materials.

More specifically, the invention relates to an improved process for obtaining a stable titanium sulfate solution by interacting a domestic titaniferous ore, such as ilmenite, with a mineral acid solubilizing agent, such as sulfuric acid.

Titanium oxide is an important white pigment used in many commercial applications and particularly in coating compositions, such as paints, enamels, and lacquers. It is usually obtained by calcining the purified $TiO_2$ precipitate recovered from the hydrolysis of a titanium sulfate solution prepared by dissolving ilmenite, previously ground to about 200 mesh, with sulfuric acid. This yields a substantially dry, sulfated "attack mass," consisting of a mixture of titanium and iron sulfates together with small amounts of free sulfuric acid. This mass then is dissolved in water (usually with a small amount of sulfuric acid) and a solution results of about 50° Bé. containing finely-divided and colloidally-dispersed slimes adapted to be removed through clarification treatment. Upon suitably cooling the clarified solution, crystals of iron sulfate or copperas result, following the removal of which a second clarification or purification treatment is resorted to in order to provide a solution in satisfactory condition for hydrolysis and $TiO_2$ precipitation.

Although titanium is the ninth most abundant element and large quantities exist in the Western Hemisphere, practically all $TiO_2$ produced in this country is derived from beach sand ilmenite ore obtained in Travancore, India. This sand is an exceedingly fine type of titaniferous material which can be easily concentrated and shipped at low cost to this country. Its $TiO_2$ content is around 60–61% and its iron (Fe) content analyzes to about 24–25% (approximately 40 parts of iron to each 100 parts of $TiO_2$). In contrast to this, other ores, such as domestic ilmenite (United States, Canadian, etc.) run to only about 35–45% $TiO_2$ and have an undesirably high iron content of 30–40%. That is, they will contain in excess of 60 parts and may range up to 100 parts or greater of iron for each 100 parts of $TiO_2$. Oxides of other elements (magnesium, aluminum, silicon, zirconium, chromium, vanadium, phosphorus, members of the rare earth metals group, etc.), in amounts up to 5% or greater, also may be present as impurities in both types of ores.

In further illustration of the wide divergence in composition which exists between Indian and domestic ores, there is given below a comparative analysis of representative Indian, United States (Adirondack), and Canadian ilmenites:

Table I

|  | Indian | Adirondack | Canadian |
|---|---|---|---|
|  | Percent | Percent | Percent |
| $TiO_2$ | 61.0 | 44.4 | 39.0 |
| Fe (total) | 25.0 | 33.1 | 36.1 |
| FeO | 10.7 | 37.4 | 29.1 |
| $Fe_2O_3$ | 23.8 | 5.8 | 19.3 |
| $Fe/TiO_2$ | .41 | .74 | .93 |

Because Indian ilmenite has a high titanium value and lower iron content, it is favored most among $TiO_2$ manufacturers as a titanium source, since its use affords production of solutions of low $Fe-TiO_2$ ratio, essential to processes which will yield pigments of uniformly high quality. The presently existing unsettled international situation has disrupted supplies of Indian ilmenite to this country, with the result that pigment manufacturers must now resort to domestic type ores higher in iron and lower in titanium content in their $TiO_2$ production. Sulfate solutions prepared from these ores present many serious problems in procuring a satisfactory type of solution for hydrolysis. Thus, while Indian and domestic ores react with sulfuric acid of the proper strength under conditions well understood in the art, subsequent dissolution of the sulfated masses provides titanium solutions of naturally different composition. Each will contain colloidally dispersed slimes which must be coagulated and removed but the ease of accomplishing this is to a large extent dependent upon concentration and gravity of the involved solution. Solutions of low specific gravity clarify more readily but the concentration may be lower than required in subsequent steps of the titanium-producing operation. To illustrate, it is undesirable to work with solutions of greater than 1.6 specific gravity (approximately 54° Bé.). More concentrated solutions than this are very difficult to properly clarify or free from colloidal slimes or other materials and this difficulty increases rapidly with increase of concentration. Since specific gravity depends on the dissolved salts and acid, a variation in the composition of the ore as well as a variation in the ratio of ore to acid will cause a substantial change in solution composition, even though the specific gravity be held substantially constant. Hence, solutions from Indian sand will be quite different from those obtained from domestic ores, even though in both instances the same ratio of titanium to free sulfuric acid prevails.

While the maximum gravity at which a domestic ore solution can be clarified in order to free it of slimes and impurities is substantially the same as that for an Indian ilmenite solution, the $TiO_2$ content of the domestic ore solution may suffer a 30% drop. In addition, its iron content will increase as the titanium content decreases. Again, and as already stated, the later steps in the titanium operation, especially during hydrolysis, require the existence of a relatively constant ratio of sulfuric acid, over and above that required to form the sulfate of iron, to titanium, e. g., that a ratio of around 1.7 mols of $H_2SO_4$ per mol of $TiO_2$, preferably prevail. The excessive amount of iron carried into the solution from domestic ores and the consequent decrease in titanium content will result in an unstable form of solution undesirably low in free sulfuric acid content. Such solutions tend to develop premature hydrolysis or become "active" by reason of the formation and presence therein of undesired so-called "wild" seeds or nuclei. In the following table, analyses are given of solutions prepared from the ores shown in Table I through reaction of sulfuric acid, followed by dissolving with acidified water and with metallic iron to reduce any ferric iron present and, in addition, provide a small amount of trivalent titanium to assure the absence of ferric iron in the solution:

*Table II*

|  | Indian | Adirondack | Canadian |
|---|---|---|---|
| Baumé_____degrees__ | 52 | 52 | 52 |
| $TiO_2$_____grams per liter__ | 156 | 137 | 112 |
| Fe_____do____ | 112 | 121 | 136 |
| $H_2SO_4$ (active)_____ | 324 | 285 | 233 |
| Fe/$TiO_2$_____ | .72 | .88 | 1.21 |
| $H_2SO_4/TiO_2$ (molar)_____ | 1.7 | 1.7 | 1.7 |

By the term "active" $H_2SO_4$, as used in the foregoing table, is meant all $H_2SO_4$ not combined with iron present in the solution.

The wide variation in titanium content of solutions prepared from various titaniferous ores is evident from this table. The domestic ilmenite solutions in said table develop activity in their passage through the plant. While their acid content may be increased so as to stabilize them and provide a molar ratio of acid to titanium in excess of 1.7, acid addition to solutions low in titanium is objectionable because a further drop in the $TiO_2$ content results, when holding the Baumé constant, and a greater plant capacity is required to handle a given tonnage of soluble $TiO_2$. A still greater objection resides in the fact that the resulting solutions become too high in active acid and do not hydrolyze readily and then at lower yields, with the result that a poor quality of pigment is obtained. As a consequence, existing processes for obtaining hydrolyzable solutions of a satisfactory type from domestic ores are unsuitable and a primary object of the present invention is to overcome these and other difficulties encountered in previous efforts to obtain such satisfactory solutions.

It is among the further and particular objects of this invention to provide a stable type of hydrolyzable titanium sulfate solution having a high titanium oxide content, from domestic ilmenite ores; to provide a novel method for regulating the iron-titanium ratio of said solutions without depending upon the source of the ore used in their preparation; to provide titanium sulfate solutions of this type which have a composition comparable to solutions produced from the solubilization of Indian ilmenite with sulfuric acid; and to provide crystalloidal solutions of titanium sulfate of high clarity from domestic ores which are readily adapted to hydrolysis for the production of high quality $TiO_2$ products yielding $TiO_2$ pigments of excellent quality upon conventional calcination. Further objects and advantages of the invention will be evident from the following description and accompanying drawing in which the single figure comprises a diagrammatic flow sheet of a titanium sulfate-producing operation, in accordance with one method of adapting the invention.

Referring to the drawing and to one preferred method of carrying out the invention, the usual steps in a titanium oxide pigment-producing operation for preparing a hydrolyzable titanium sulfate solution are shown. These comprise the ore-acid attack stage, and the dissolving, first clarification, iron removal, and second clarification stages. In accordance with this invention, all of these steps are resorted to, except that the composition of a solution undergoing treatment after sulfuric acid decomposition of the domestic ilmenite is regulated and controlled by means of an advantageous recycling operation, e. g., there is returned, from a subsequent stage of the system, to the solution preparation operation, such as the dissolving stage, a portion of the solution undergoing treatment, particularly that obtained immediately after removal of iron, in order to blend said solution with that being prepared in said dissolving operation.

Thus, there may be obtained in accordance with one practical and preferred adaptation of the invention, a titanium sulfate solution having a gravity of 1.54–1.57 (51–53° Bé.), at 55° C., a $TiO_2$ concentration in excess of 140 g./l., and a constant ratio of sulfuric acid, over and above that required to form iron sulfate, of about 1.7 mols $H_2SO_4$ per mol of $TiO_2$, by conventionally decomposing about 1 part of crushed or pulverized (200 mesh or finer size) domestic ilmenite ore in a suitable vessel with about 1.5 parts of relatively concentrated (80–90%) sulfuric acid. Said ore may comprise any type of titaniferous material containing, as already noted, in excess of 60 parts of iron per 100 parts of $TiO_2$. Examples of such ores include New York (Adirondack), Canada, Virginia, California, etc., ilmenites. If desired, acceleration of the decomposition reaction can be effected by applying heat to the reaction vessel or by admitting steam to the reactants. The dry sulfated attack mass resulting on completion of the decomposition reaction is then lixiviated in a suitable manner, such as by adding sufficient water or acidified liquor (diluted sulfuric acid) thereto. During such lixiviation or dissolving, a sufficient amount of a solution of low iron-titanium ratio, preferably from a subsequent stage of the titanium solution-producing operation, is also added. This low iron-titanium liquor should be at such concentration as will insure production of a solution, going to the first clarification stage of the system, having an iron content of less than 90 parts per 100 parts of $TiO_2$ and preferably from 70 to 80 parts of iron per 100 parts of dissolved $TiO_2$, said latter range being comparable to that shown for Indian ilmenite in Table II above (containing from about .7–.8 part by weight of iron for each part by weight of TiO₂). When employing such Indian ore, the solution from the dissolving operation, before copperas removal, is approximately that shown in Table II. Subsequent to crystallization, its TiO₂ content may exceed 180 g./l. while its iron content will be around 60 g./l. Said iron content is about 3 pounds per 10 pounds of TiO₂, as compared to about 7 pounds of iron per 10 pounds of TiO₂ in the original solution. In accordance with this invention, the solution so blended or mixed with the constituents in the dissolving operation should have a TiO₂ content of at least 140 and may range up to, say, 200 g./l., a preferred TiO₂ content being from about 170–180 g./l. Its iron content should be less than 40 parts per 100 parts of TiO₂, and preferably ranges from 25 to 35 parts by weight for each 100 parts of TiO₂ in solution. The low iron-titanium liquor so recycled preferably comprises that obtained in the titanium-producing operation prior to hydrolysis and that which results immediately following removal of the major portion (as copperas) of the iron immediately after the first clarification step in effecting slime removal. Crystallization and removal of copperas results in a decrease of the iron content with a smaller increase in TiO₂ content, due to the copperas taking a portion of the water from the solution, and it has been found that recirculation of such low iron liquor is most advantageous for obtaining optimum benefits under the invention. Furthermore, by means of such recirculation, it will be found that the characteristics of the solution going to the first clarification and subsequent hydrolysis stages of the titanium-producing operation will be essentially the same as if Indian ilmenite was being consumed in the plant as a source of the titanium raw material, and will be characterized by substantially complete freedom from any danger of activity or development of premature hydrolysis by reason of the presence of undesired seed nuclei or wild seeds.

In addition, the present process enables one to avoid the use of high sulfuric acid-titanium ratios in the solutions which would be otherwise required to prevent premature hydrolysis of the solution and a complete avoidance of a radical change in its chemical composition. Hence, the present invention renders it possible to continue plant operations in the normal way, in the absence of Indian ilmenite ore employment, with the exception that a portion of the solution is returned to the dissolving stage after the removal of iron and a slight increase in the volume of such solutions becomes necessitated. With this exception, the plant can continue to employ domestic ores without incurring any sacrifice in quality of hydrolysate or ultimate TiO₂ pigment, or encountering other dangers attending the use of modified operations due to the high iron-titanium ratio present in the starting material.

To a clearer understanding of the invention, the ensuing specific examples are given which are only intended as in further illustration but not in limitation of the invention:

*Example I*

Sulfated ilmenite mass containing 343 parts by weight of soluble TiO₂, 1440 parts by weight of H₂SO₄ (free and combined) and 328 parts by weight of soluble iron was prepared by reacting sufficient sulfuric acid with finely-divided Canadian ilmenite. This mass was dissolved by adding water, 87 parts by weight of metallic iron as a reducing agent, and a low iron titanium sulfate solution having the composition:

| | |
|---|---|
| TiO₂ grams per liter | 185 |
| Fe do | 61 |
| H₂SO₄ (total) do | 492 |
| F. A. | 70 |

This low iron titanium solution comprised a portion of the titanium solution recovered, after copperas removal, from the first clarification portion of the subsequent titanium oxide pigment producing operation. The amount of solution added to the sulfated ilmenite mass during dissolving contained 300 parts by weight of TiO₂ and 99 parts by weight of iron. The water was added in addition to the low iron titanium solution and was sufficient to give a final solution having a gravity of 52° Baumé. This solution, on analysis, was found to be approximately equal to that shown in Table II above for commercial solutions made from Indian ore. As such, it could be processed in the plant in the usual way without the dangers incident to an unstable solution with resulting loss in quality of the final pigment.

This solution was then processed in accordance with conventional methods, after which it was hydrolyzed in accordance with the disclosure of U. S. Reissue 18,854. The concentrated solution prior to the hydrolysis operation was found to be remarkably free from activity or "wild seeds" content and the TiO₂ pigment resulting therefrom after calcination in the presence of appropriate fritting agents was equal in quality and properties to products from Indian ilmenite.

*Example II*

A soluble titanium and iron sulfate mass was prepared by reacting ground domestic ilmenite, analyzing 41.2% TiO₂ and 34.8% Fe, with sufficient strong sulfuric acid to obtain a dry product. The sulfated mass contained 100 parts by weight of soluble TiO₂, 86.5 parts by weight of soluble iron, and 395 parts by weight of H₂SO₄ (total). It was quite soluble in water and gave a ferric iron free solution when dissolved in a mixture of water and a titanium sulfate solution quite low in iron and with the aid of 20 parts of metallic iron as a reducing agent. The titanium sulfate solution so added during the dissolving operation contained 67 parts by weight of TiO₂, 27 parts by weight of iron, and 187 parts by weight of H₂SO₄ (total) and analyzed 180 grams TiO₂ per liter, 72 grams Fe per liter, and 506 grams H₂SO₄ per liter, and was obtained from a later step in the pigment producing operation, i. e., a portion of the solution recovered from the first clarification stage after copperas removal. The amount of water used was sufficient to give a hydrometer reading of 52° Bé. at 60° C. The final solution was similar in composition to that prepared from low iron Indian ilmenite and was found to be equally stable during normal processing in the usual way in the TiO₂ plant.

*Example III*

Adirondack ilmenite, containing 44.4% TiO₂ and 33.1% iron was sulfated in a large plant reaction vessel by strong sulfuric acid treatment, the mixture being heated to the necessary reaction temperature by injection of steam. The resulting dry sulfate mass contained 193 parts by weight of soluble TiO₂, 147 parts by weight of soluble iron, and 700 parts by weight of H₂SO₄ (total).

The liquid used in the dissolving operation comprised a mixture of water and a titanium sulfate solution from which the major part of the iron had been removed by copperas crystallization. This solution analyzed 142 grams TiO$_2$ per liter, 43 grams iron per liter, and 344 grams of total H$_2$SO$_4$ per liter. The amount used contained 79.5 parts of TiO$_2$ and 26.2 parts iron while the water was sufficient to obtain 52° Baumé gravity. This dilute titanium sulfate solution was added directly to the sulfate mass and 23 parts by weight of scrap iron was also added in order to reduce any ferric iron present in the dissolving mass, as well as to provide a small amount of trivalent titanium to insure ferric iron absence. The resulting 52° Baumé solution was an excellent type of hydrolyzable titanium sulfate solution, was free of "wild" seeds, and responded particularly well to flocculation treatment to remove the slimes during clarification.

While described as applied to certain preferred embodiments, the invention is not limited thereto and hence variance therefrom may be had without departing from its underlying concept and scope. Thus, it will be obvious that the titanium solution used in the recycling operation and fed to the solution-producing or dissolving stage of the system may comprise that obtained from any stage of the operation subsequent to copperas removal and prior to hydrolysis. That is, it may consist of the solution which results immediately after copperas removal or may comprise that obtained from the second clarification after slime removal, or can consist of a mixture of both. In any event, such recycling will result in the important and primary object of the invention, namely, that production is assured of a stable titanium sulfate solution which will be free from any undesired tendency to hydrolyze prematurely or manifest any indication of the existence therein of wild or active nuclei.

Additionally, though a preferred titanium sulfate solution having the values above-mentioned with respect to gravity, TiO$_2$ content, and ratio of H$_2$SO$_4$ to TiO$_2$ is readily obtainable, in accordance with this invention, such solution, as already indicated, merely comprises one of preferred type and other titanium sulfate solutions of different concentration, gravity and H$_2$SO$_4$-TiO$_2$ ratios may be likewise produced. It will be found that the invention is generally useful in obtaining stable, hydrolyzable titanium sulfate solutions having a TiO$_2$ content of at least 140 g./l. and ranging up to, say, 180 g./l., a specific gravity (measured at 55° C.) of from 1.4 (42° Bé.) to 1.6 (54° Bé.), and an acidity equivalent to from about 1.6 to 1.8 mols of active H$_2$SO$_4$ per mol of TiO$_2$.

I claim as my invention:

1. A process of producing titanium dioxide which comprises the steps of extracting with concentrated H$_2$SO$_4$ a titanium-bearing ore containing in a combined form in excess of 60 parts of iron for each 100 parts of titanium oxide in the presence of sufficient added recycled titanium sulfate solution recovered in a subsequent stage of the process after iron removal but prior to hydrolysis to produce in the subsequently-formed acid solution a ratio of Fe content to TiO$_2$ content of less than 4:5, leaching said treated mixture and producing a solution having a specific gravity of from 1.4 to 1.6 and a free H$_2$SO$_4$ content of 1.6 to 1.8 mols per mol dissolved TiO$_2$, removing insoluble material therefrom, and then hydrolyzing said solution to precipitate TiO$_2$.

2. A process of producing titanium dioxide which comprises the steps of extracting with concentrated H$_2$SO$_4$ a titanium-bearing ore containing in a combined form in excess of 60 parts of iron for each 100 parts of titanium oxide in the presence of sufficient added titanium sulfate solution containing less than 40 parts of iron per 100 parts of TiO$_2$ obtained from the copperas removal stage of the process to produce in the subsequently-formed acid solution a ratio of Fe content to TiO$_2$ content of less than 4:5, leaching said treated mixture and producing a solution having a specific gravity of from 1.4 to 1.6 and a free H$_2$SO$_4$ content of 1.6 to 1.8 mols per mol dissolved TiO$_2$, removing insoluble material therefrom, and then hydrolyzing said solution to precipitate TiO$_2$.

3. A process of producing titanium dioxide which comprises the steps of extracting with concentrated H$_2$SO$_4$ a titanium-bearing ore containing in a combined form 60–100 parts of iron for each 100 parts of titanium oxide in the presence of sufficient added aqueous media and a recycled titanium sulfate solution containing from about 25–35 parts of iron per 100 parts of TiO$_2$ produced in the copperas removal stage of the process to produce in the subsequently-formed acid solution a ratio of Fe content to TiO$_2$ content of less than 4:5, leaching said treated mixture and producing a solution having a specific gravity of from 1.4 to 1.6 and a free H$_2$SO$_4$ content of 1.6 to 1.8 mols per mol dissolved TiO$_2$, removing insoluble material therefrom, and then hydrolyzing said solution to precipitate TiO$_2$.

4. A process of producing titanium dioxide which comprises the steps of extracting with concentrated H$_2$SO$_4$ a titanium-bearing ore containing in a combined form from 60–100 parts of iron for each 100 parts of TiO$_2$ in the presence of sufficient added aqueous media and a recycled titanium sulfate solution containing from 25–35 parts of iron per 100 parts of dissolved TiO$_2$ obtained in the copperas removal stage of the process, to produce in the subsequently-formed acid solution a ratio of Fe content to TiO$_2$ content of less than 4:5, leaching said treated mixture and producing a stable solution having a specific gravity of from 1.54 to 1.57 and a constant ratio of sulfuric acid over and above that required to form iron sulfate of about 1.7 mols H$_2$SO$_4$ per mol of dissolved TiO$_2$, removing insoluble material therefrom, and then hydrolyzing the resulting solution to precipitate titanium oxide.

ROBERT MARTIN McADAM.